United States Patent

[11] 3,630,548

| [72] | Inventors | Robert B. Kimm;<br>Richard J. May, both of Jackson, Mich. |
|---|---|---|
| [21] | Appl. No. | 4,548 |
| [22] | Filed | Jan. 21, 1970 |
| [45] | Patented | Dec. 28, 1971 |
| [73] | Assignee | Aeroquip Corporation<br>Jackson, Mich. |

[54] HOSE-FITTING SYSTEM
1 Claim, 2 Drawing Figs.

[52] U.S. Cl. .................................................. 285/174,
285/247
[51] Int. Cl. .................................................. F16l 33/22
[50] Field of Search ............................................. 285/247,
251, 245, 246, 256, 259, 250, 334.4, 39, 149, 174

[56] References Cited
UNITED STATES PATENTS

| 951,704 | 3/1910 | Schmidt ...................... | 285/334.4 X |
| 2,306,594 | 12/1942 | Cowles ......................... | 285/251 |
| 2,476,480 | 7/1949 | Burckle et al. ................ | 285/245 X |
| 3,140,106 | 7/1964 | Thomas et al. ............... | 285/256 X |
| 3,237,974 | 3/1966 | Press ........................... | 285/256 X |
| 3,520,562 | 7/1970 | Moos ........................... | 285/245 X |

Primary Examiner—Thomas F. Callaghan
Attorney—Jerry K. Harness

ABSTRACT: A two-piece hose nipple for mounting in a socket to form a complete hose fitting for securement to a hose end. The nipple comprises a male section threaded into the socket and a female section which can accommodate any of a number of different fitting shapes. The nipple parts are united by a tapered joint so that the two-piece nipple may be unscrewed from a hose and fitting assembly without the two parts becoming disengaged from each other.

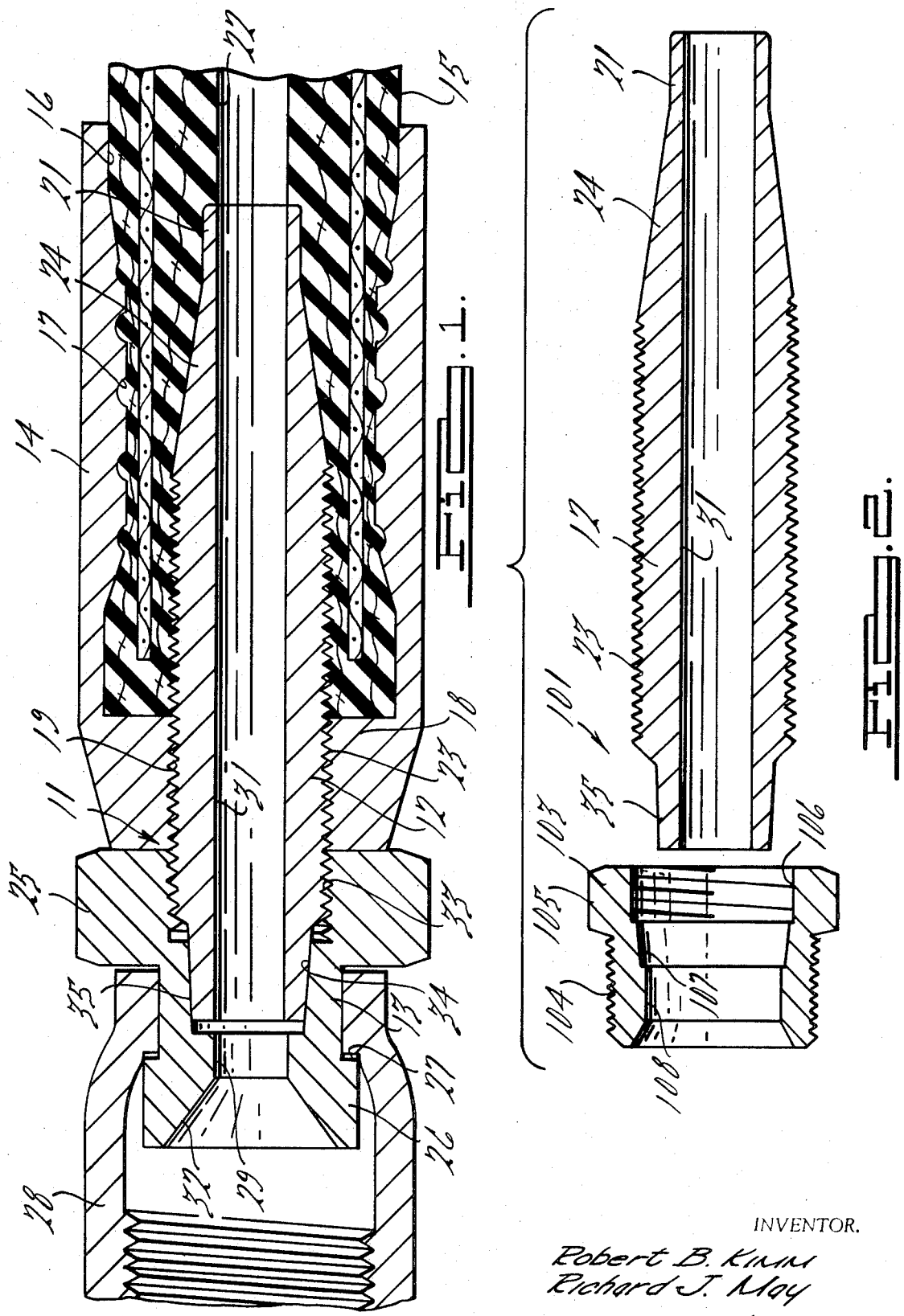

HOSE-FITTING SYSTEM

BACKGROUND OF THE INVENTION

1. Field of the Invention

The invention relates to nipples for reuseable hose fittings, of the type in which the socket nipple is frictionally and clampingly mounted on the end of a hose.

2. Description of the Prior Art

The prior art is exemplified by U.S. Pat. No. 2,371,971 issued March 20, 1945. This is a one-piece hose-fitting nipple which must be fabricated entirely of relatively expensive bar stock. When made in large quantities, this type of nipple is fabricated on an automatic screw machine. However, where small quantities are desired, the tooling and labor costs for an automatic screw machine made it uneconomical to fabricate the type of nipple shown in this patent. Moreover, when using a nipple of the type shown in the patent, a different construction must be made available for each type of fitting or coupling desired.

BRIEF SUMMARY OF THE INVENTION

According to the invention, the nipple has two sections, a tubular, externally threaded section which is threadably mounted in the socket and a body section secured to the tubular section in such manner that the two sections will be firmly united. The tubular section is of narrow diameter and could be fabricated of relatively inexpensive tubular or bar stock. The body section can take any one of a number of shapes depending on the type of connection desired. The means of uniting the two sections comprises a bore in the body section having a slight taper and an extension on the tubular section fitting in this taper in such manner that the residual frictional force between the sections is greater than that required to disassemble the entire nipple from the socket after the two have been mounted on a hose end.

BRIEF DESCRIPTION OF THE DRAWINGS

FIG. 1 is a cross-sectional view of one embodiment of the nipple assembled to a socket and hose, and FIG. 2 is an exploded cross-sectional view of another embodiment of the nipple in which the body section has an external pipe thread.

DESCRIPTION OF THE PREFERRED EMBODIMENTS

Referring first to the embodiment of FIG. 1, the nipple is generally indicated at 11 and comprises a tubular section 12 and a body section 13. Tubular section 12 is adapted to be threadably mounted in a socket 14 of conventional type which is mounted on the end 15 of a hose. Socket 14 has a relatively wide end 16 and a central portion 17 with interior threads which will frictionally grip the outside wall of the hose while compressing it in the manner shown. The end wall 18 of socket 14 has threaded bore 19 within which tubular section 12 is threaded.

The tubular section of nipple 11 may be fabricated of tubular or bar stock, and has a relatively narrow end 21 adapted to end the bore 22 of hose 15. The main portion of tubular section 12 has an external thread 23, this portion of the tubular section being connected to end portion 21 by a gradually flared portion 24. Thus, when tubular section 12 of the connector is threaded into end wall 18 of the socket, it will spread the wall of hose 15 outwardly against the threads 17 so that socket 14 will be held firmly on the hose end.

Body section 13 of the nipple comprises a tool-receiving portion 25 adapted to receive a tool such as a wrench, and a fitting supporting portion 26 having a slot 27 for the retention of a fitting 28. A bore 29 is formed in body section 13 contiguous with bore 31 of tubular section 12 and terminating in a flared opening 32 on the side remote from the tubular section. An internal thread 33 is formed in the other end of body section 13 so that the tubular section is threadably mountable on thread 23 of section 12.

The means for uniting sections 12 and 13 of nipple 11 comprises a slightly tapered bore 34 in section 13 leading from threads 33 toward bore 29, and a similarly tapered extension 35 on section 12 which fits into bore 34. The taper angle is determined so that the parts when tightened will form a fluid tight seal and will provide the needed frictional connection between the sections. Several different taper angles may be used. A taper angle in the range of 5° to 10° has been found to be very satisfactory. The tightening torque should be brought up to a value such that the residual frictional force between sections 12 and 13 will be greater than the force needed to disassemble nipple 11 from socket 14 after the two have been mounted on a hose end. For this purpose, the tolerances on portions 34 and 35 of the parts may be such that the outer end of extension 35 will engage surface 34 before or at the same time as the remainder of extension 35. In some sizes it has been found desirable to make the taper angle of the bore 34 slightly larger than that of the extension 35. This construction not only insures that the tip of the extension 35 will engage the bore 34 first but will also cause a slightly radially inward deflection of the extension 35 thereby increasing the frictional engagement between the two parts.

The operation of the device will be apparent from the foregoing description. Socket 14 having been mounted on hose end 15, and sections 12 and 13 of nipple 11 having been preassembled, the entire nipple will be threaded into socket 14, thus securing the hose to the socket and nipple combination. When it is desired to disassemble the hose fitting from the hose, it is merely necessary to rotate the entire nipple by applying a tool to portion 25 of section 13. The sections 12 and 13 will remain united for the reasons discussed above.

FIG. 2 shows another embodiment of the invention which incorporates the same principles but shows a different type of fitting section thus illustrating the utility of the invention. The entire nipple is indicated at 101 and comprises a tubular section 12 and a body section 103. The section 12 is of course identical with section 12 of the previous embodiment. Section 103 however is shown as having a pipe thread 104 extending from its tooling-receiving portion 105. The threaded portion 106 within section 105 is mountable on thread 23 of section 12, and a tapered bore 107 leads to a bore 108 which is coaxial with bore 31 of section 12. Tapered bore 107 will be used to unite sections 12 and 103 by engaging tapered extension 35 of section 12. By this illustration it will be seen that the body section of the nipple to be attached to the elongated tubular section 12 may take on many different forms. The form required, of course, will be determined by the type of connection needed for the one end of the hose line. Typical examples could be rotatable nuts, exteriorly threaded ends, elbows or even bulkhead mountings. In all cases the section 12 will be the same and it is only necessary to select the appropriate body section desired.

What is claimed is:

1. In combination, a hose assembly comprising a hose having a central bore for receiving material to be transmitted through the hose, and a hose end fitting secured to an end of said hose; said fitting comprising a socket positioned over and engaging the end of the hose and having a threaded aperture at one end axially aligned with the bore of said hose and a two-piece nipple comprising a tubular section having an exterior threaded portion threaded into said socket aperture and extending into the bore of said hose substantially the length of said socket wherein said socket and said tubular section of said nipple compress the end of the hose therebetween, said tubular section having a part of said threaded portion extending outwardly of said socket and terminating in a cone extension having a cone angle of less than 10°, a body section of said nipple having a bore therethrough, and means thereon for accommodating connection of said hose assembly into a material flow system, said body section bore having bore, the threads adjacent one end and a conical seat forming a portion of said bore, the cone angle of said seat being substantially equal to the cone angle of said cone extension of said tubular section, said body section being sealingly, frictionally connected to said tubular section by the engagement of the threaded part of the threaded portion of said tubular section with the threads in said body section and the cone surface engagement of said cone extension with said conical seat whereby said nipple may be disassembled from said socket and hose without the sections of said nipple coming apart.

* * * * *

UNITED STATES PATENT OFFICE
CERTIFICATE OF CORRECTION

Patent No. 3,630,548     Dated December 28, 1971

Inventor(s) Robert B. Kimm, et al

It is certified that error appears in the above-identified patent and that said Letters Patent are hereby corrected as shown below:

Column 2, line 72, "section bore having bore, the threads", should read -- section bore having threads --.

Signed and sealed this 17th day of October 1972.

(SEAL)
Attest:

EDWARD M. FLETCHER, JR.
Attesting Officer

ROBERT GOTTSCHALK
Commissioner of Patents